United States Patent
Gary et al.

(10) Patent No.: US 6,328,801 B1
(45) Date of Patent: *Dec. 11, 2001

(54) METHOD AND SYSTEM FOR RECOVERING AND RECIRCULATING A DEUTERIUM-CONTAINING GAS

(75) Inventors: Daniel Gary, Montigny le Bretonneux; Jean-Marc Girard, Paris; Jean-Christophe Rostaing, Buc; Jean-Marie Friedt, Neuilly sur Seine, all of (FR)

(73) Assignee: L'Air Liquide, Societe Anonyme pour l'Etude et l'Exploitation des Procedes Georges Claude, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,781

(22) Filed: Feb. 6, 1998

Related U.S. Application Data

(60) Provisional application No. 60/053,704, filed on Jul. 25, 1997.

(51) Int. Cl.[7] .............................. B05C 11/00; H01L 21/22; H01L 21/265; B01D 53/02; B01J 8/00
(52) U.S. Cl. ........................ 118/688; 118/690; 118/900; 438/795; 438/798; 55/340; 55/DIG. 30; 96/109; 261/DIG. 27; 422/234
(58) Field of Search ................................. 178/725, 690; 55/DIG. 30, 385.2, 385.1, 340; 118/688, 900; 95/117, 116; 96/108; 438/905, 909, 795, 798; 261/DIG. 27; 432/48; 422/234

(56) References Cited

U.S. PATENT DOCUMENTS

| | | | |
|---|---|---|---|
| 3,849,204 | 11/1974 | Fowler | 148/1.5 |
| 3,923,559 | 12/1975 | Sinha | 148/1.5 |
| 4,113,514 | 9/1978 | Pankove et al. | 148/1.5 |
| 4,151,007 | 4/1979 | Levinstein et al. | 148/1.5 |
| 4,331,486 | 5/1982 | Chenevas-Paule et al. | 148/1.5 |
| 4,460,673 | * 7/1984 | Sukigara et al. | 430/128 |
| 4,476,094 | * 10/1984 | Carson | 422/62 |
| 4,521,698 | 6/1985 | Taylor | 307/450 |
| 4,620,211 | 10/1986 | Baliga et al. | 357/39 |
| 4,691,433 | 9/1987 | Pimbley et al. | 437/44 |
| 4,859,620 | 8/1989 | Wei et al. | 437/44 |
| 4,915,912 | * 4/1990 | Walles et al. | 422/160 |
| 5,059,551 | 10/1991 | Chevallier et al. | 437/96 |
| 5,177,571 | 1/1993 | Satoh et al. | 257/336 |
| 5,229,311 | 7/1993 | Lai et al. | 437/43 |
| 5,352,914 | 10/1994 | Farb | 257/345 |
| 5,872,387 | * 2/1999 | Lyding et al. | 257/607 |

FOREIGN PATENT DOCUMENTS

| | | |
|---|---|---|
| 02-218128 | 8/1990 | (JP) . |
| WO94/19829 | 9/1994 | (WO) . |

OTHER PUBLICATIONS

Biersack et al, "Radiation Effects and Defects in Solids," *Gordon and Breach Science Publishers*, (1989), pp. 301–308.

(List continued on next page.)

*Primary Examiner*—Curtis Mayes
*Assistant Examiner*—J. A. Lorengo
(74) *Attorney, Agent, or Firm*—Burns, Doane, Swecker & Mathis, L.L.P.

(57) ABSTRACT

Provided is a novel method of and system for recovering and recirculating a deuterium-containing gas. According to the inventive method, a deuterium-containing feed gas is introduced into a chamber. An exhaust gas containing deuterium is removed from the chamber. The deuterium concentration of the exhaust gas is adjusted to a predetermined value, thereby producing a concentration-adjusted gas stream. Finally, the concentration-adjusted gas stream is introduced into the chamber as the deuterium-containing feed gas. The invention makes the use of deuterium, for example, in the mass production of semiconductor devices, commercially feasible.

8 Claims, 2 Drawing Sheets

OTHER PUBLICATIONS

Mikkelsen, Jr. et al, "Secondary Ion Mass Spectrometry Characterization of $D_2O$ and $H_2^{18}O$ Steam Oxidation of Silicon," *Journal of Electronic Materials*, vol. 11, No. 3, 1982, pp. 541–558.

Myers et al, "Interactions of deuterium with ion–irradiated $SiO_2$ on Si," *J. Appl. Phys.*, 67 (9), May 1, 1990, pp. 4064–4071.

Oehrlein et al, "Secondary Ion Mass Spectrometry Measurements of Deuterium Penetration into Silicon by Low Pressure RF glow Discharges," *Gordon and Breach Science Publishers, Inc.*, vol. 111 & vol. 112 (1–2) pp. 299–300.

Park et al, "The Effect of Annealing Treatment on the Distribution of Deuterium in Silicon and in Silicon/Silicon Oxide Systems," *J. Electrochem. Soc.*, vol. 139, No. 7, Jul. 1992, pp. 2042–2046.

Saks et al, "Time–dependence of the interface trap build–up in deuterium–annealed oxides after irradition," *Appl. Phys. Lett.*, 61 (25), Dec. 21, 1992, pp. 3014–3016.

\* cited by examiner

METHOD AND SYSTEM FOR RECOVERING AND RECIRCULATING A DEUTERIUM-CONTAINING GAS

CROSS REFERENCE TO RELATED APPLICATIONS

This application claims the benefit of priority of U.S. Provisional Application Ser. No. 60/053,704, filed Jul. 25, 1997, the contents of which are herein incorporated by reference.

BACKGROUND OF THE INVENTION

1. Field of the Invention

The invention relates to a novel method for recovering and recirculating a deuterium-containing gas. The invention also relates to a system for recovering and recirculating a deuterium-containing gas. The invention finds particular applicability in an annealing process during semiconductor device manufacturing.

2. Description of the Related Art

Basic processing steps involved in the manufacture of integrated circuits (ICs), for example, metal oxide semiconductor (MOS) ICs, include epitaxial growth, wafer cleaning, photolithography, ion implantation, diffusion, chemical vapor deposition (CVD), sputtering, etching and electrical testing.

Following metallization and prior to electrical testing of the devices, annealing of the wafers containing the devices under a "forming gas" atmosphere is known. A typical forming gas atmosphere includes from 5 to 10 percent by volume hydrogen ($H_2$) diluted in nitrogen ($N_2$).

The purpose of this annealing step is to passivate defects, or surface states, at the MOS interface generated during earlier IC manufacturing steps. Such surface states include, for example, dangling silicon bonds at the silicon surface and interface trap charge $Q_{it}$ present at the $Si/SiO_2$ interface. Such defects can degrade the operating characteristics of the formed device by effectively removing charge carriers needed for the operation of the device or, alternatively, by the generation of unwanted charge carriers.

Notwithstanding the use of such an annealing process, high energy charge carriers may induce a "depassivation" of the previously passivated defects during normal operation of, for example, a MOS transistor. This depassivation can lead to subsequent, progressive degradation of the electrical properties of the transistor. The aging characteristics of the IC, in turn, become detrimentally affected. See, e.g., R.A.B. Devine et al, Applied Physics Letters, 70(22), p. 2999 (1997).

The above-described phenomena have become more and more problematic with the increases in electric field intensity brought on by increased device integration and the shrinking geometries associated therewith. Device lifetime may thus become unacceptably short for future generations of integrated circuits.

To address these problems, it has recently been proposed to conduct the post-metallization annealing step using pure deuterium ($D_2$) or a deuterium-containing gas mixture in place of pure hydrogen ($H_2$) or a hydrogen-containing gas mixture. In so doing, it has been shown that submicron MOS transistor lifetime can be significantly increased over that attained using hydrogen. The use of a deuterium-containing annealing atmosphere is discussed, for example, in International Publication No. WO 94/19829, which discloses contacting a silicon wafer with a deuterium-containing material to form Si—D and Si—OD bonds on a silicon surface at an interface with a silicon dioxide layer.

While the use of deuterium in the post-metallization annealing process is of great interest, its application on an industrial scale has, to date, been impractical. This impracticality is a result of the high cost and limited availability of the deuterium isotope. In particular, for the deuterium flow-rates required, the cost of treating chamber exhaust as waste gas can be prohibitive.

SUMMARY OF THE INVENTION

The aforementioned problems associated with the state of this art have been overcome or conspicuously ameliorated by the processes and systems in accordance with the invention.

According to a first aspect of the present invention, a novel method of recirculating a deuterium-containing gas is provided. The method comprises the steps of: (a) introducing a deuterium-containing feed gas into a chamber; (b) removing from the chamber an exhaust gas containing deuterium; (c) adjusting the deuterium concentration of the exhaust gas to a predetermined value, thereby producing a concentration-adjusted gas stream; and (d) introducing the concentration-adjusted gas stream into the chamber as the deuterium-containing feed gas.

A second aspect of the invention involves a system for carrying out the process described above. The system comprises: (a) a gas introducing line for introducing a deuterium-containing feed gas into a chamber; (b) an exhaust line for removing from the chamber an exhaust gas; (c) a makeup gas line for adding a makeup gas containing deuterium to the exhaust gas; and (d) means for adjusting the deuterium concentration of the exhaust gas to a predetermined value to produce a concentration-adjusted gas as the deuterium-containing feed gas.

Through the invention, a method and system for recovering and recycling a deuterium-containing gas stream have been realized, which find particular applicability in the manufacture of semiconductor devices. In a particularly advantageous aspect of the invention, the post-metallization annealing of semiconductors in a deuterium atmosphere can be practiced on an industrial scale. The inventive method and system make the use of deuterium commercially feasible, and result in marked improvements in device lifetime as compared to hydrogen treatment.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

Figure 1:
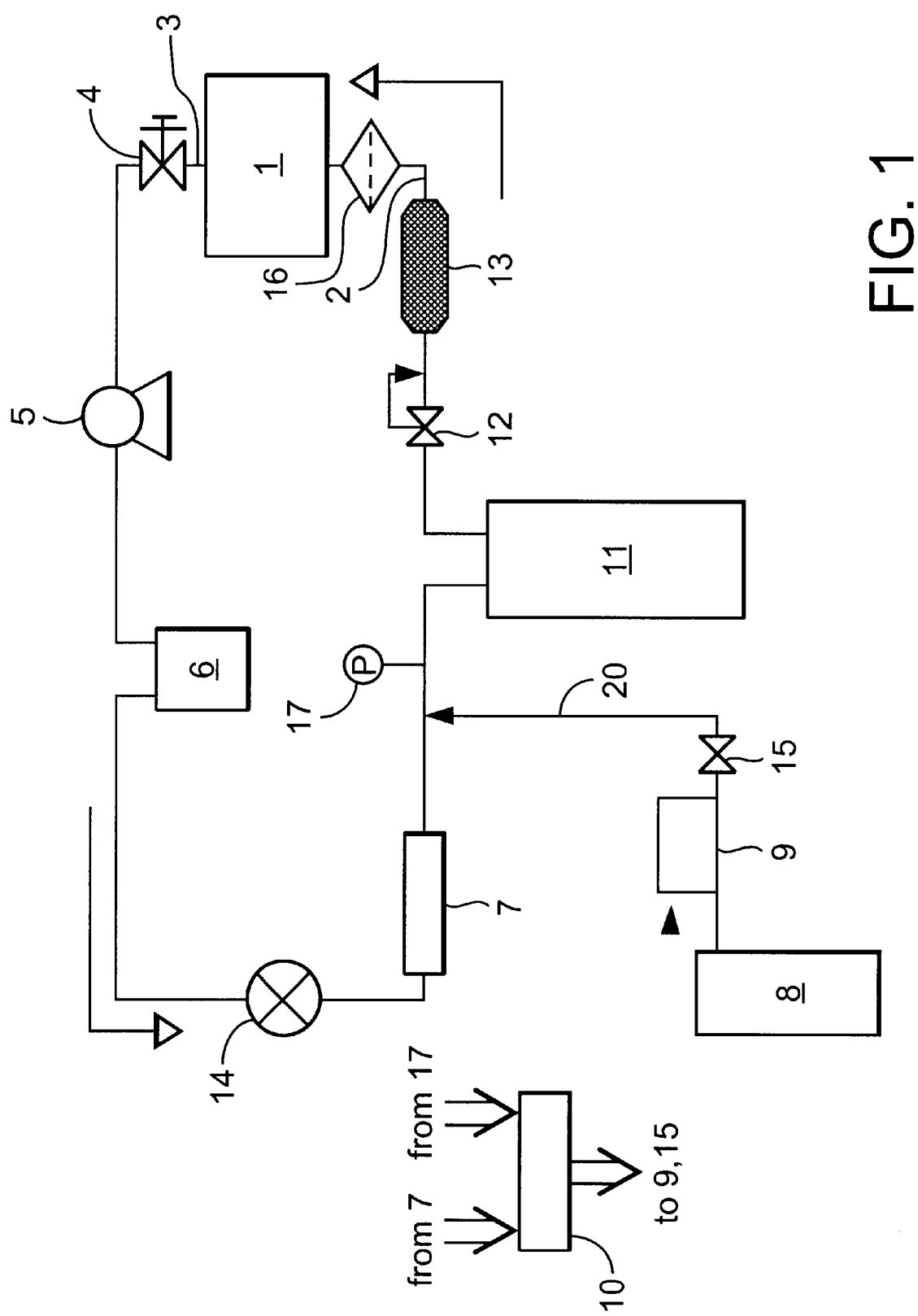
FIG. 1 illustrates an exemplary system for recovering and recirculating a deuterium-containing gas in accordance with the invention.

The invention provides a method and system for recovering and recycling a deuterium-containing gas. The method and system have particular applicability in the manufacture of semiconductor devices.

The inventive system will now be described with reference to FIG. 1. The system includes a chamber 1 which can form part of, for example, a semiconductor processing system. Of particular interest is a diffusion furnace useful in heat treating, for example, annealing semiconductor wafers.

Connected to chamber 1 is a feed line 2 for introducing a deuterium-containing feed gas (forming gas) thereto. A preferred material of construction for feed line 2, as well as the other gas transporting lines to be described, is electropolished stainless steel. Other suitable materials, however, are known to persons skilled in the art.

As used herein, the term "deuterium-containing" means that the concentration of the deuterium in the gas is from 1 to 100 percent by volume of deuterium. Thus, the deuterium-containing feed gas can be 100 percent deuterium or, alternatively, can be a mixture which contains deuterium and one or more other gases.

In the case of a gas mixture, the deuterium is preferably mixed with an inert gas, such as argon (Ar), neon (Ne), krypton (Kr), xenon (Xe), helium (He), nitrogen ($N_2$), carbon dioxide ($CO_2$), nitrous oxide ($N_2O$), nitric oxide (NO), or mixtures thereof.

The isotopic enrichment of the deuterium preferably has a value of from 75 to 100 percent by volume, and is more preferably above 99 percent by volume.

The flowrate of the forming gas introduced into chamber 1 can be controlled by conventional flowrate control means, such as one or more mass flow controllers (not shown). The flowrate of pure equivalent deuterium is preferably from 10 to 10,000 sccm.

Also connected to chamber 1 is an exhaust gas line 3 for withdrawing an exhaust gas from the chamber. In accordance with the invention, the exhaust gas is recycled to chamber 1 after adjustment of the deuterium concentration in the exhaust gas to a predetermined value, and after various optional treatments described below.

The various lines and components through which the exhaust gas is recycled to chamber 1 are hereinafter referred to as the "recycle loop." Furthermore, for purposes of describing gas line and component positions in the recycle loop, the chamber exhaust line is disposed at the most upstream location and the gas line feeding directly into the chamber is disposed at the most downstream location of the recycle loop.

For processes below atmospheric pressure, of from about 0.1 to 5 atmospheres, a throttle valve 4 and a pump 5 can be located downstream of chamber 1 in order to control the pressure inside of the chamber and to transport the exhaust gas. For safety reasons, pump 5 should be compatible with hydrogen, i.e., it should be anti-explosive and air tight.

A buffer tank 6 can be disposed downstream of pump 5 for storing the exhaust gas withdrawn from chamber 1 in order to temper pressure variations. Buffer tank 6 takes the form of any container suitable for storing gas at atmospheric or higher pressure. Operation at higher than atmospheric pressure is of interest, for example, if the process in chamber 1 is conducted at a pressure above atmospheric pressure.

Buffer tank 6 is preferably surface treated so as to be compatible with the high purities required in the electronics manufacturing industry. The surface treatment can include, for example, mechanical polishing or electropolishing and passivation.

A compressor 14 can optionally be disposed downstream of buffer tank 6 for compressing and transporting the exhaust gas stored in tank 6 through the system. As with pump 5, the compressor should be compatible with hydrogen and is preferably of the dry type.

In the case of a semiconductor annealing process, a small fraction of deuterium introduced into the treatment chamber is typically consumed. To ensure constant processing conditions, the deuterium concentration in the gas being recycled to chamber 1 is adjusted to make up for this loss of deuterium. In particular, the difference in deuterium concentration between a target, predetermined value and the deuterium concentration in the exhaust gas is determined and compensated for, if required, by the addition of deuterium-containing makeup gas to the recycle loop. Suitable means for adjusting the deuterium concentration are described below.

A deuterium analyzer 7 is provided which, according to a preferred aspect of the invention, can measure the concentration of deuterium in the exhaust gas passing through the recycle loop in a continuous manner. Deuterium analyzer 7 can be any instrument capable of measuring deuterium concentration. Suitable instruments include, for example, detectors based on the measurement of thermal conductivity (TCD) or density of the exhaust gas.

Analyzer 7 can be disposed in-line with the recycle loop, such that the entire gas flowing through the recycle line also passes through the analyzer, as shown in FIG. 1. The analyzer may require the sample pressure to be reduced, which can be accomplished by known means. Alternatively, with reference to FIG. 2, the analyzer can be connected to the recycle line through a sampling line 18. In this alternative embodiment, a small volume of the flow through the recycle line is transported through the sampling line to analyzer 7.

Figure 2:
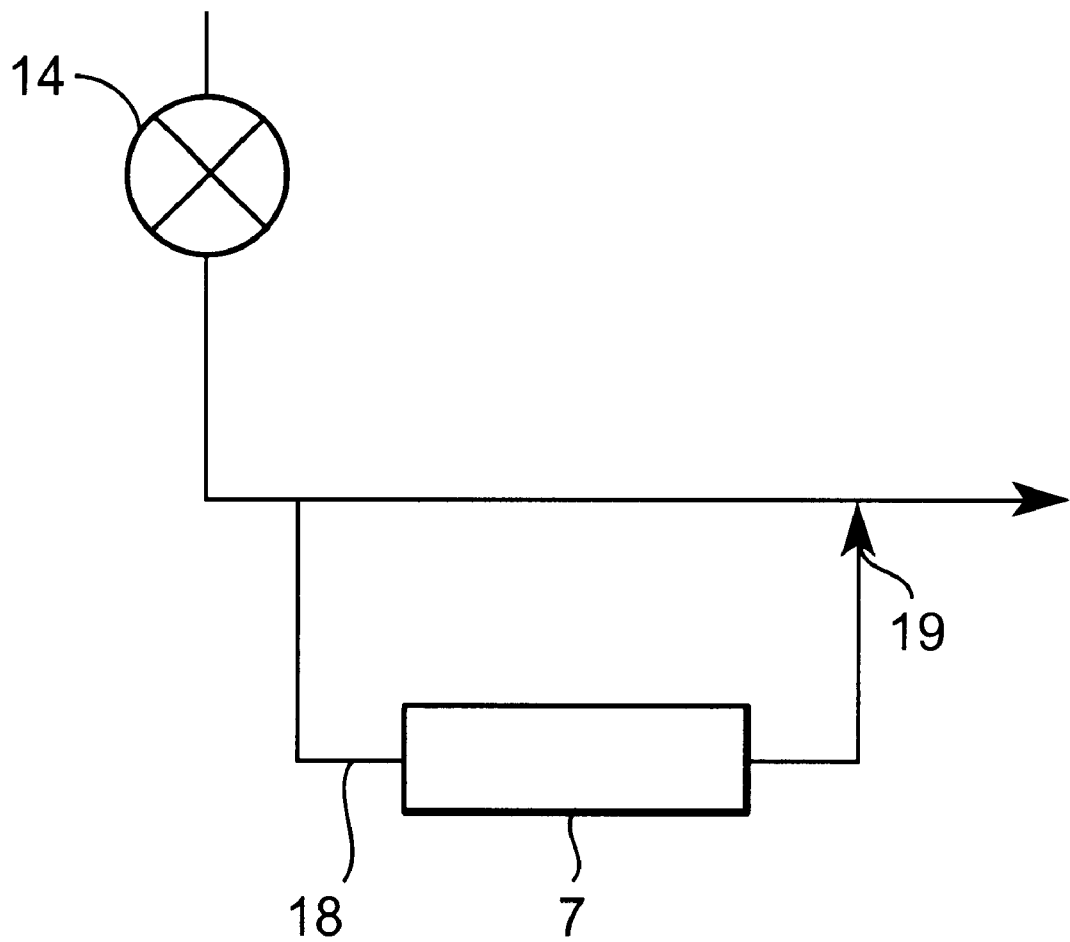
FIG. 2 illustrates a deuterium analyzer configuration in accordance with one aspect of the invention.

It is desirable to maintain the total gas volume in the recycle line at a substantially constant level. Therefore, where a sampling line is employed for gas analysis, it is preferable that the volume of gas withdrawn from the recycle loop through the sampling line be replaced. This can be accomplished, for example, by providing a sample gas recycle line 19 for reintroducing the gas removed through the sampling line into the recycle loop after analysis thereof, as shown in FIG. 2.

Alternatively, an inert gas, such as nitrogen, argon, etc., can be introduced into the recycle loop through an inert gas introducing line (not shown) in an amount equal to that being withdrawn through the sampling line. The inert gas introducing line for this purpose should be disposed downstream of sampling line 18.

Referring again to FIG. 1, a deuterium-containing makeup gas feed line 20 is connected to the recycle loop downstream of analyzer 7 for continuously adjusting the elemental composition of the gas in the recycle loop, if necessary. Makeup gas feed line 20 is fed from a deuterium-containing gas storage container 8. Valve 15 is connected to makeup gas feed line 20 for initiating and shutting off the flow of the makeup gas to the recycle loop. Control of the makeup gas flowrate is accomplished by flow controller 9, such as a mass flow controller also connected to makeup gas feed line 20.

The deuterium-containing makeup gas can be pure deuterium or a mixture of deuterium and an inert gas at a known concentration. In the case a gas mixture is to be used, the non-deuterium gas should be the same as the non-deuterium gas in the forming gas. Thus, the suitable inert gases listed above in reference to the feed gas are also applicable to the makeup gas.

Where a gas mixture is to be used for the makeup gas, the gases can be premixed and held in storage container 8 as a mixture. Alternatively, the gases making up the makeup gas mixture can be held in separate containers and mixed prior to introduction into the recycle loop using known mixing means and methods.

The purity of the makeup gas prior to its being introduced into the recycle loop is preferably greater than 1 ppm of elemental impurities. Thus, the deuterium-containing makeup gas can be purified prior to introduction into the recycle line by way of a purifier (not shown). Suitable purification materials include, for example, a zeolite, a metal oxide, a metal oxide mixture or a supported palladium. A Pd—Ag alloy membrane purifier is particularly preferred in the case pure deuterium is used for the makeup gas.

The amount of makeup gas introduced into the recycle line is precisely controlled by a controller 10. Data from analyzer 7 and any other necessary information, such as flow rate and/or pressure which can be obtained from pressure 17 and flow measurement devices, respectively, can be used as inputs to controller 10 to determine the required makeup gas flowrate. Controller 10 sends an output signal to valve 15 and flow controller 9 for automatic and continuous flowrate control.

As described above, the control system can continuously and automatically adjust the deuterium concentration of the gas in the recycle loop. Controller 10 can be a programmable logic controller (PLC) or any other suitable device. Those skilled in the art will readily be able to design and integrate appropriate controls in the inventive system by use of well known devices, circuits and/or processors and means for their control. Further discussion of this matter is omitted as it is deemed within the scope of persons of ordinary skill in the art.

Downstream of the makeup gas feed line 20 is optionally disposed a buffer container 11 for storing the resulting concentration-adjusted gas. The gas can be stored as a compressed gas at a pressure of, for example, 2 to 200 atmospheres. The description above in reference to the materials of construction for buffer tank 6 is equally applicable to buffer container 11.

The concentration-adjusted gas in buffer container 11 can then be introduced into chamber 1 after pressure reduction by any known means, for example, a pressure regulator 12 or a restrictive orifice disposed downstream of buffer container 11.

Optionally provided is a purifier 13 for purifying the feed gas prior to its being introduced into chamber 1. As with the previously described purifier for the makeup gas, purifier 13 can include, for example, a zeolite, a metal oxide, a metal oxide mixture or supported palladium, with a Pd—Ag alloy membrane purifier being particularly preferred for pure deuterium. Purifier 13 is preferably located downstream of compressor 14 and upstream of reactor 1, in order to remove trace contaminants introduced into the gas by the process and compressor.

For further purification, a filter, such as a submicronic particle filter 16 can optionally be added downstream of purifier 13 and upstream of chamber 1.

The locations of the system components illustrated in FIG. 1 are merely exemplary, and other locations are possible and understood by persons skilled in the art. For example, as shown in FIG. 1, analyzer 7 can be installed upstream of chamber 1 and downstream of compressor 14. Alternatively, the analyzer can be disposed downstream of buffer container 11 and upstream of chamber 1.

In order to maintain a constant deuterium concentration in the process, the deuterium-containing makeup gas feed line 20 is preferably connected to the recycle loop upstream from buffer container 11 if analyzer 7 is located downstream of chamber 1. On the other hand, if analyzer 7 is located downstream of buffer container 11, makeup gas feed line 20 is preferably connected to the recycle loop just upstream of chamber 1. Configurations in which buffer container 11 is disposed between analyzer 7 and makeup gas feed line 20 should be avoided.

A method of recovering and recirculating a deuterium-containing gas in accordance with the invention will now be described. While not being limited thereto, the inventive method will be described with reference to a post-metallization annealing step in a semiconductor manufacturing process.

Referring again to FIG. 1, the deuterium-containing feed gas (forming gas) is introduced into process chamber 1 through feed line 2, with the flowrate being controlled by one or more mass flow controllers. The annealing temperature in chamber 1 is typically from 200 to 600° C., preferably from 350 to 450° C. Annealing time is typically from 15 minutes to one hour, preferably from 20 to 40 minutes. The process temperature and time, however, will depend on the specific product being formed and, more specifically, on the metallization materials used in forming the device.

An exhaust gas is withdrawn from process chamber 1 through exhaust line 3, and is recycled to chamber 1 after adjustment of the deuterium concentration to a predetermined value, and after various optional treatments.

The pressure in process chamber 1 is controlled to a desired value by throttle valve 4 and pump 5. The exhaust gas is transported by pump 5 for storage in buffer tank 6. The exhaust gas stored in tank 6 is then compressed and transported through the system by compressor 14.

To make up for the consumption of deuterium in process chamber 1 during the annealing process, the deuterium concentration in the gas being recycled to chamber 1 is continuously adjusted, as needed, to a desired, predetermined value. The deuterium concentration in the exhaust gas is determined and compensated for by the addition of deuterium-containing makeup gas through line 20 to the recycle loop.

At least a portion of the exhaust gas withdrawn from chamber 1 is introduced into deuterium analyzer 7. Prior to its being introduced into the analyzer, the sample pressure can be reduced, if necessary. As described above, the entire gas flowing through the recycle line can be directed through analyzer 7 if the analyzer is disposed in-line with the recycle gas loop.

Alternatively, a small volume of the gas flowing through the recycle loop can be removed therefrom and directed to analyzer 7 through a sampling line, as shown in FIG. 2. To maintain the total gas volume in the recycle line at a substantially constant level, the volume of gas withdrawn from the recycle loop through the sampling line can be replaced. This can be accomplished, for example, by introducing into the recycle loop an inert gas, such as nitrogen, argon, etc., in an amount equal to that being withdrawn therefrom through the sampling line.

The elemental composition of the gas in the recycle line is automatically and continuously adjusted using the means described above by feeding a deuterium-containing makeup gas into the recycle loop through makeup gas feed line 20. The flow of makeup gas to the recycle line can be initiated by opening valve 15 and adjusting flow controller 9. The deuterium-containing makeup gas can be purified prior to introduction into the recycle loop using a purifier as described above.

The resulting concentration-adjusted gas is optionally stored as a compressed gas in buffer container 11. The concentration-adjusted gas in buffer container 11 can then be introduced into chamber 1 following pressure reduction. The feed gas can optionally be purified prior to its being introduced into chamber 1 by way of purifier 13 to remove trace contaminants introduced, for example, by the process and the compressor. Prior to being introduced into process chamber 1, the feed gas is optionally further purified by submicronic particle filter 16.

The above-described system and method in accordance with the invention allow for large scale deuterium processing in an economically feasible manner. Significant improvements in semiconductor device lifetime can be attained.

While the invention has been described in detail with reference to specific embodiments thereof, it will be apparent to one skilled in the art that various changes and modifications can be made, and equivalents employed, without departing from the scope of the appended claims.

What is claimed is:

1. A system for recovering and recirculating a deuterium-containing gas, comprising:
    a) deuterium-containing gas source for providing a deuterium-containing feed gas;
    b) a gas introducing line connected to receive the deuterium-containing feed gas from the gas source, and to introduce the deuterium-containing feed gas into a chamber;
    c) an exhaust gas line for removing from said chamber an exhaust gas;
    d) a makeup gas line for adding a makeup gas containing deuterium to said exhaust gas; and
    e) means for adjusting the deuterium concentration of said exhaust gas to a predetermined value to produce a concentration-adjusted gas as said deuterium-containing feed gas.

2. The system according to claim 1, further comprising a purifier disposed upstream of said chamber.

3. The system according to claim 2, wherein said purifier contains a purification material selected from the group consisting of a zeolite, a metal oxide, a metal oxide mixture and supported palladium.

4. The system according to claim 1, further comprising a buffer container upstream of said makeup gas line, said buffer container being connected to receive said exhaust gas and to reintroduce said exhaust gas into a gas line.

5. The system according to claim 4, further comprising a pump for transporting the exhaust gas to the buffer container.

6. The system according to claim 1, further comprising a buffer container upstream of said chamber, said buffer container being connected to receive said concentration-adjusted gas and to introduce said concentration-adjusted gas into said chamber as said feed gas.

7. The system according to claim 1, wherein said chamber is a semiconductor processing chamber.

8. The system according to claim 7, wherein said semiconductor processing chamber is a diffusion furnace for performing an annealing process.

\* \* \* \* \*